US005802018A

United States Patent [19]
Kim et al.

[11] Patent Number: 5,802,018
[45] Date of Patent: Sep. 1, 1998

[54] METHOD FOR REPRODUCING MULTIPLE OPTICAL DISKS BASED ON THE DETERMINATION OF A REPRODUCTION ORDER

[75] Inventors: Bum Ki Kim; Kyung Chan Park, both of Suwon, Rep. of Korea

[73] Assignee: Samsung Electronics Co., Ltd., Kyungki-do, Rep. of Korea

[21] Appl. No.: 747,895

[22] Filed: Nov. 13, 1996

[30] Foreign Application Priority Data

Feb. 27, 1996 [KR] Rep. of Korea .................. 1996-4828

[51] Int. Cl.$^6$ .................................................. G11B 17/22
[52] U.S. Cl. .................................... 369/30; 369/47
[58] Field of Search ............................ 367/30, 33, 34, 367/36, 37, 38, 41, 178, 47, 54, 48

[56] References Cited

U.S. PATENT DOCUMENTS 5,467,326 11/1995 Miyashita et al. ..................... 369/30
5,559,776 9/1996 Ikenaga ................................. 369/30
5,640,375 6/1997 Barrett ................................... 369/30

*Primary Examiner*—Tan Dinh
*Attorney, Agent, or Firm*—Sughrue, Mion, Zinn, Macpeak & Seas, PLLC

[57] ABSTRACT

A method for sequentially reproducing optical discs in a multidisc player is provided. The multidisc player comprises a disc changer capable of being loaded with a plurality of optical discs, a memory, and a microcomputer for controlling the multidisc player. The method includes the following steps. First, information data corresponding to each of the plurality of optical discs is detected. Then, the information data is evaluated to determine if program data recorded on each of the plurality of optical discs corresponds to a same particular program. Afterwards, a reproduction order of the plurality of optical discs is determined based on the information data if the program data recorded on each of the plurality of optical discs corresponds to the same particular program. Finally, the plurality of optical discs are sequentially reproduced in accordance with the reproduction order to reproduce the same particular program.

17 Claims, 5 Drawing Sheets

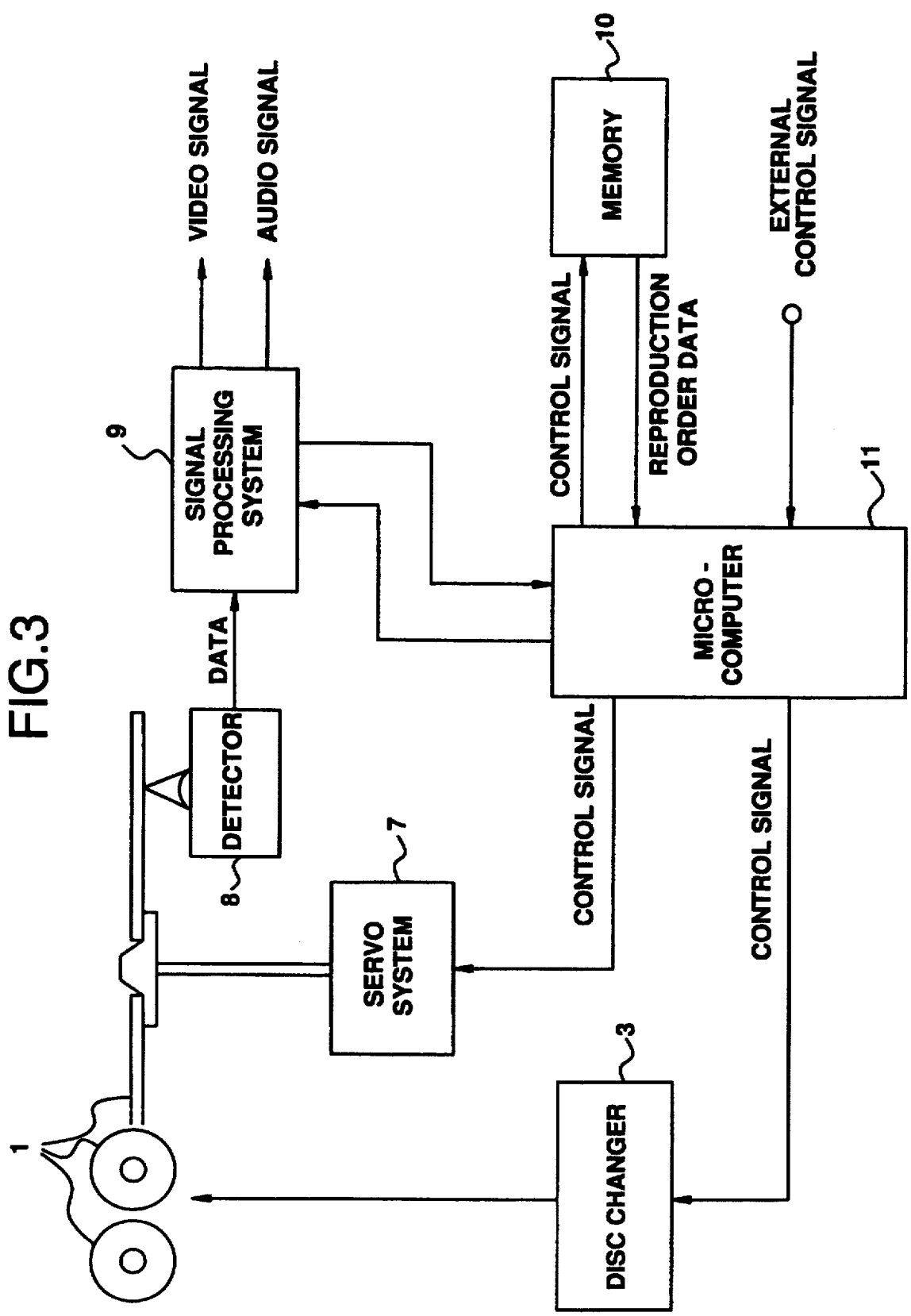

METHOD FOR REPRODUCING MULTIPLE OPTICAL DISKS BASED ON THE DETERMINATION OF A REPRODUCTION ORDER

RELATED APPLICATIONS

The present application is based on Korean Application No. 4828/1996 which is incorporated herein by reference for all purposes.

FIELD OF THE INVENTION

The present invention relates to a method for sequentially reproducing optical discs in a multidisc player. More particularly, the present invention relates to a method which is capable of analyzing information data recorded on a plurality of optical discs when data (e.g. video and/or audio data) relating to the same program are successively recorded on such discs. Furthermore, the method is capable of detecting the order in which the program is sequentially recorded on the discs based on the analysis of the information data. Also, the method is capable of sequentially reproducing the program from the optical discs in the order in which the program is recorded on the discs.

BACKGROUND OF THE INVENTION

FIG. 1 illustrates the structure of a disc changer used in a conventional multidisc player. In particular, the disc changer 3 comprises a plurality of trays 2 in which a plurality of optical discs 1 can be respectively loaded. Moreover, the disc changer 3 is adapted to automatically select one of the discs 1 loaded in the trays 2 and reproduce data from the selected disc 1 based on a command input by a user. A more detailed explanation of the disc changer 3 is disclosed in Korean Patent Application No. 94-5365, entitled "DISC CHANGER", filed on Mar. 17, 1994.

Recently, techniques for recording and reproducing various data to and from optical discs have rapidly been developed. As a result, optical discs have been recognized as being an excellent storage media for simultaneously storing audio data and video data (e.g. movies). However, the amount of storage capacity available on optical discs is limited, and thus, many types of programs (e.g. movies, television programs, video images, and other audio-visual shows) which have long durations cannot be stored on a single optical disc.

In order to overcome such problem, a method has been proposed in which data relating to the same program is stored on two or more optical discs. The principle underlying the proposed method stems from the existing practice of recording sequential portions of a program on at least two video tapes.

However, when a program is successively recorded on a plurality of optical discs and such discs are loaded in a multidisc player, the order in which such discs will be reproduced by the multidisc player cannot readily be determined by the user. Accordingly, a substantial possibility exists that the multidisc player will reproduce the optical discs in the wrong order, and thus, the program stored on such discs will not be reproduced in its proper order.

In order to ensure that the optical discs will be reproduced in the proper order, the user must memorize the order in which the discs were loaded into the multidisc player. Alternatively, the user must physically open the trays of the disc changer and view the actual labels of the optical discs to ensure that they are arranged such that the program will be reproduced in its appropriate order. If the user does not execute either of the above procedures, he or she must reproduce the optical discs at random to confirm that the optical discs will be correctly reproduced. However, each of the methods above is very inconvenient.

SUMMARY OF THE INVENTION

In order to overcome the problems above, an object of the present invention to provide a method for sequentially reproducing optical discs in a multidisc player which automatically reproduces such discs in the appropriate order.

In order to achieve the above object as well as other objects, a method for sequentially reproducing optical discs in a multidisc player is provided. The multidisc player comprises a disc changer capable of being loaded with a plurality of optical discs, a memory, and a microcomputer for controlling said multidisc player, and the method comprises the steps of: (a) detecting information data corresponding to each of said plurality of optical discs; (b) evaluating said information data to determine if program data recorded on each of said plurality of optical discs corresponds to a same particular program; (c) determining a reproduction order of said plurality of optical discs based on said information data if said program data recorded on each of said plurality of optical discs corresponds to said same particular program; and (d) sequentially reproducing said plurality of optical discs in accordance with said reproduction order to reproduce said same particular program.

BRIEF DESCRIPTION OF THE DRAWINGS

The above objects and other objects, features, and advantages of the present invention will become more apparent by describing preferred embodiments thereof with reference to the accompanying drawings in which:

FIG. 3 is a block diagram of one embodiment of the construction of a multidisc player of the present invention;

DETAILED DESCRIPTION OF THE PREFERRED EMBODIMENTS

The following description of the preferred embodiments discloses specific circuit configurations and components. However, the preferred embodiments are merely examples of the present invention, and thus, the specific components described below are only used to more easily describe such embodiments and to provide an overall understanding of the present invention. Accordingly, one skilled in the art will readily recognize that the present invention is not limited to such specific components. Furthermore, the descriptions of various features and structures of the present invention which would be known to one skilled in the art are omitted for the sake of clarity and brevity.

Figure 2:
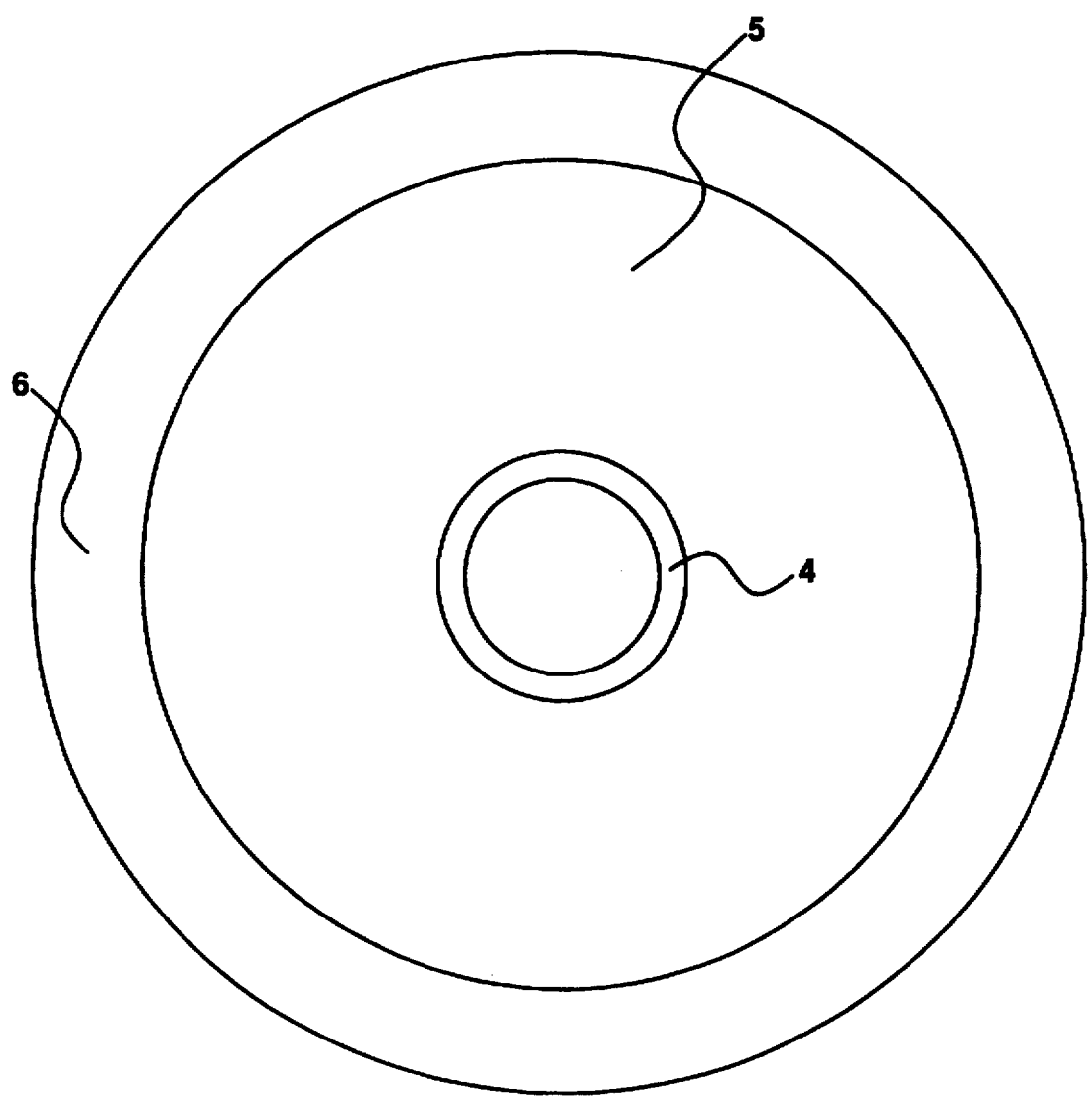
FIG. 2 illustrates a recording format of an optical disc.

FIG. 2 illustrates the format in which an optical disc is recorded. As shown in the figure, the disc generally comprises a lead-in area 4, a general signal area 5, and a lead-out area 6. In the general signal area 5, the audio and video data relating to a particular program are recorded. In the lead-in area 4, information data is recorded which indicates the format and characteristics of the video and audio data contained the general signal area 5. Finally, in the lead-out area 6, data is recorded which indicates that all of the video and audio data contained in the general signal area 5 has been reproduced.

In light of the above recording format, when an optical disc is initially loaded into a multidisc player, a microcomputer of the multidisc player reads the various information data recorded on the lead-in area 4 of the optical disc. Then, based on such information data, the microcomputer controls various operations of the multidisc player including the manner in which the optical disc will be reproduced.

Figure 1:
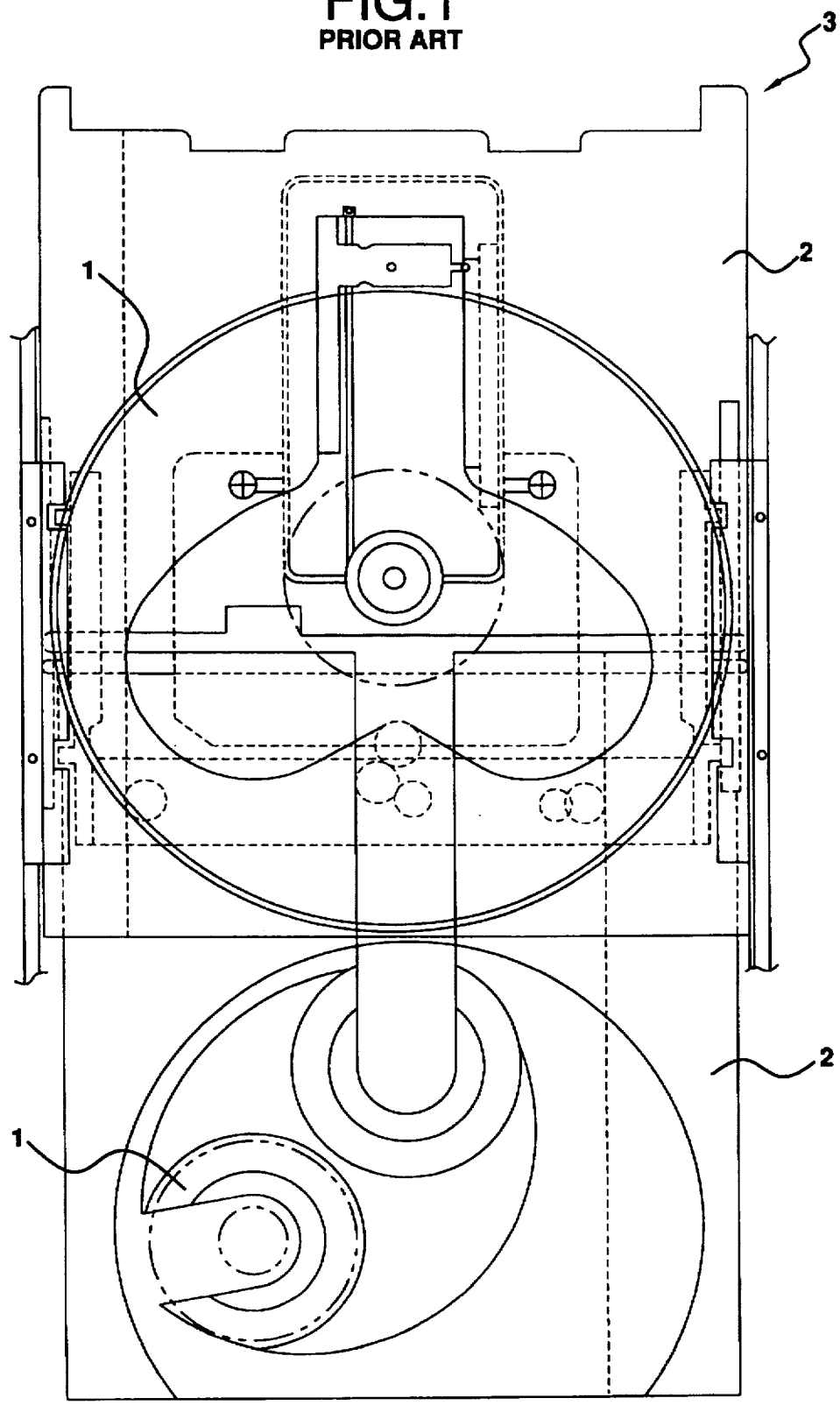
FIG. 1 illustrates the construction of a disc changer in a conventional multidisc player.

One embodiment of a multidisc player of the present invention is shown in FIG. 3. Furthermore, various features in FIG. 3 which are analogous to the features shown in FIG. 1 are represented by the same reference numerals. As shown in FIG. 3, the multidisc player comprises a disc changer 3, a servo system 7, a detector 8, a signal processing system 9, a memory 10, and a microcomputer 11.

The disc changer 3 contains various trays 2 for storing optical discs 1 and supplies a selected disc to the servo system 7 in accordance with a first control signal output from the microcomputer 11. Then, the servo system 7 rotates the selected disc 1 in a certain direction and at a particular speed in response to a second control signal output by the microcomputer 11.

The detector 8 comprises an optical pickup (not shown) and an optical pick up transport device (not shown), detects the data recorded on the selected disc 1, and outputs corresponding reproduced data. The reproduced data comprises audio and video data relating to a particular program as well as information data. The information data comprises reproduction order data which indicates the sequence in which the selected disc 1 is to be reproduced in order to properly reproduce the particular program. Such information data may be located in the lead-in area 4 of the selected disc 1.

The signal processing system 9 inputs the reproduced data from the detector 8 and processes such data. Then, the system 9 outputs the resultant video data to a monitor (not shown) and outputs the resultant audio signal to a speaker (not shown). Furthermore, the signal processing system 9 outputs the reproduction order data to the microcomputer 11, and the microcomputer 11 stores such data in the memory 10.

The operation of the above multidisc player will be described in detail with reference to FIGS. 4A and 4B. Specifically, FIGS. 4A and 4B show a flowchart of an illustrative procedure by which the microcomputer 11 performs a method for sequentially reproducing a plurality of optical discs which relate to the same particular program.

As described in more detail below, a plurality of optical discs 1 may contain data corresponding to the same particular program. Specifically, a first portion of the particular program may be recorded on a first optical disc 1, a second portion of the particular program may be recorded on a second optical disc 1, etc., until the entire particular program is recorded on the plurality of optical discs 1. Furthermore, reproduction order data may be recorded on the lead-in areas 4 of the discs 1, and such data may indicate that the first optical disc 1 should be reproduced first, the second optical disc 1 should be reproduced second, etc.

Subsequently, when the optical discs 1 are loaded in the multidisc player, the player reads the reproduction order data from the lead-in areas 4 of the discs 1 and determines the reproduction order in which the discs 1 should be reproduced. Then, the optical discs 1 are sequentially reproduced based on the detected reproduction order.

Figure 4A:
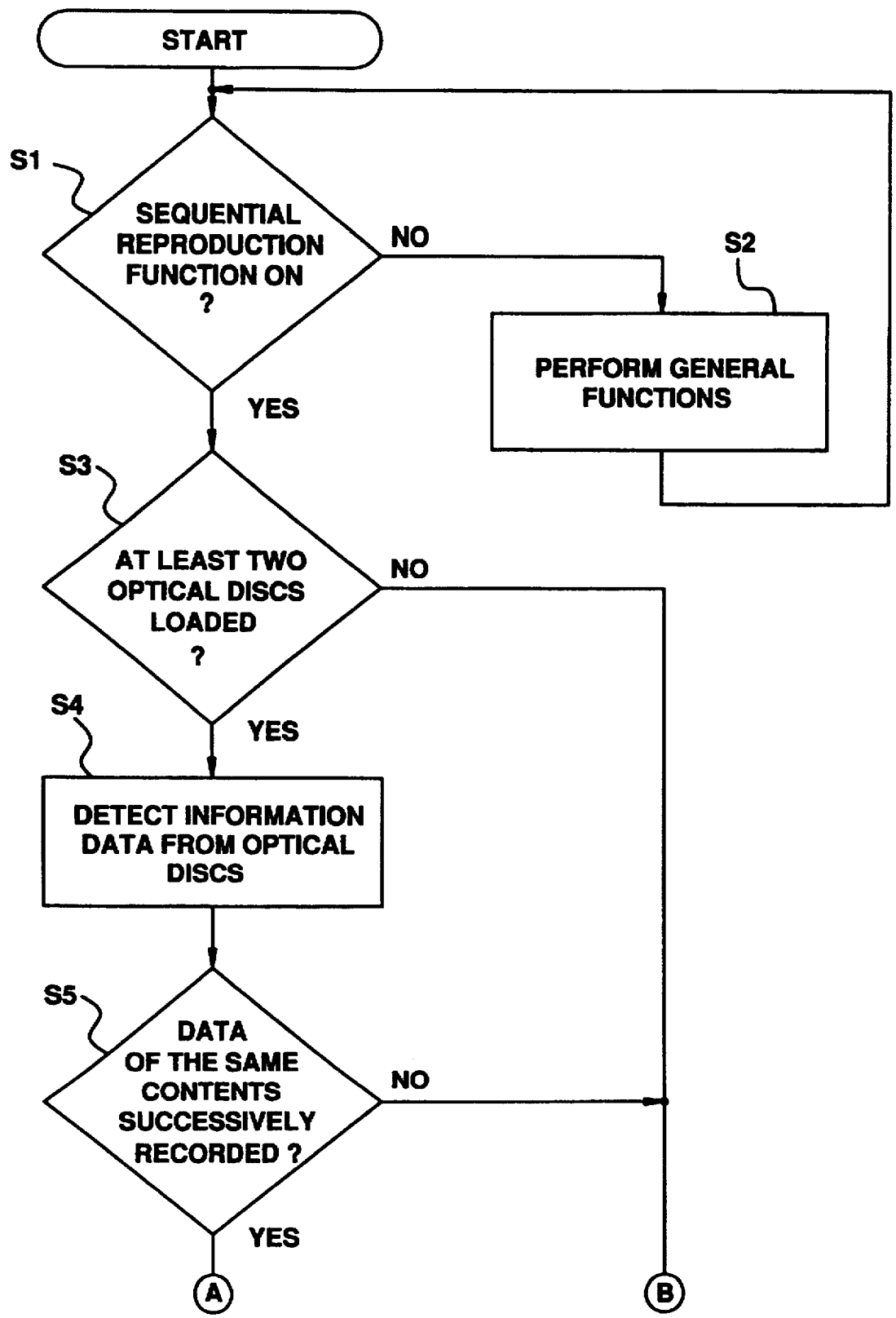
FIG. 4A is one portion of a flowchart illustrating one embodiment of an operation of a microcomputer shown in FIG. 3.
Figure 4B:
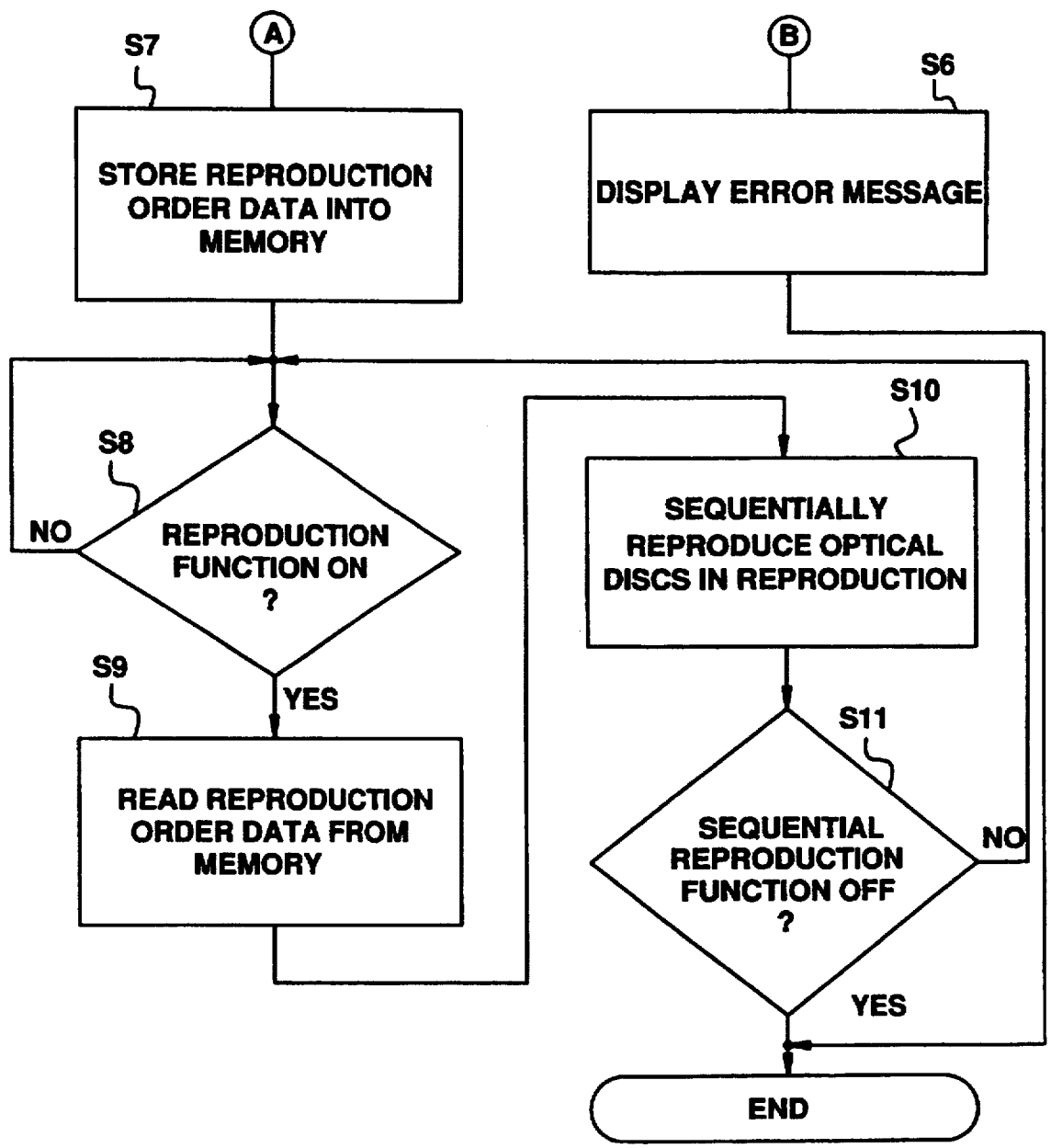
FIG. 4B is another portion of the flowchart illustrating one embodiment of the operation of the microcomputer shown in FIG. 3.

As shown in FIG. 4A, the microcomputer 11 determines whether or not the user has input a sequential reproduction command to place the system in a sequential reproduction mode (step S1). If the sequential reproduction command has not been input, the microcomputer 11 remains in a standard reproduction mode and performs standard reproduction functions (step S2). For example, in the standard reproduction mode, the microcomputer 11 may reproduce data from an optical disc 1 loaded in the current tray 2 of the disc changer 3. In particular, the disc 1 is rotated by the servo system 7, and the detector 8 reproduces audio and video data from the optical disc 1 and outputs such data to the signal processing system 9. Then, the signal processing system 9 processes the audio and video data, outputs the resultant video signal to the monitor (not shown), and outputs the resultant audio signal to the speaker (not shown). As a result, the data recorded on the optical disc 1 selected by the user is reproduced.

On the other hand, when the user inputs the sequential reproduction command in step S1, the microcomputer 11 determines whether a plurality of optical discs 1 are loaded in the disc changer 3 (step S3). If two discs 1 are not loaded in the disc changer 3, the microcomputer 11 places the multidisc player in a sequential reproduction disable state and outputs a control signal to display an error message on the monitor (not shown) (step S6).

However, if at least two discs 1 are loaded, the microcomputer 11 instructs the servo system 7 and the detector 8 to reproduce the information data from the lead-in areas 4 of the optical discs 1 (step S4). Then, the microcomputer 11 analyzes the information data to determine whether the video and audio data recorded on at least two of the optical discs 1 relate to the same particular program (step S5). If the data recorded on at least two different discs 1 do not correspond to the same particular program, the microcomputer 11 places the multidisc player in the sequential reproduction disable state and outputs the control signal to display the error message on the monitor (not shown) (step S6).

On the other hand, if at least two discs 1 contain data relating to the same particular program, the microcomputer 11 outputs a third control signal to the memory 10 to instruct the memory to store the information data (e.g. the reproduction order data) detected from the lead-in areas 4 of the discs 1 (step S7). Consequently, the memory 10 contains the data which informs the microprocessor 11 the order in which the plurality of discs 1 must be reproduced in order to properly reproduce the recorded program.

Subsequently, the microcomputer 11 determines whether the user has input a command to reproduce the particular program recorded on the plurality of discs 1 (step S8). If the user has not input such command, the microcomputer 11 remains in a state is in which it continuously determines whether or not the reproduction command has been input. After the user inputs the appropriate command, the microcomputer 11 outputs a control signal to the memory 10 to retrieve the reproduction order data from the memory 10 (step S9). Then, the microcomputer 11 sequentially reproduces the optical discs 1 loaded in the disc changer 3 in the order which corresponds to the reproduction order data (step S10). As a result, the particular program recorded on the plurality of optical discs 1 is properly reproduced.

After the particular program has been reproduced, the microcomputer determines whether or not the user has input a sequential reproduction stop command to switch the system out of the sequential reproduction mode (step S11). If such a command has been input, the procedure ends. On the other hand if the user did not input the stop command, the procedure returns to step S8.

As described above, the microprocessor 11 places the multidisc player in the sequential reproduction mode only when the sequential reproduction command is input by the user. However, the microprocessor 11 may be programmed to automatically place the system in such mode whenever a plurality of optical discs 1 are simultaneously loaded in the multidisc player.

As described above, the present invention retrieves information data from at least two optical discs containing at least two successive portions of the same particular program. Then, the information data is analyzed and the reproduction order of the optical discs is determined based on such analysis. Accordingly, the order in which the optical discs are sequentially reproduced is determined by the multidisc player, and thus, the ability to correctly reproduce the particular program is substantially enhanced.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A method for sequentially reproducing optical discs in a multidisc player, wherein said multidisc player comprises a disc changer for holding a plurality of optical discs, a memory, and a microcomputer for controlling said multidisc player and wherein said method comprises the steps of:
   (a) reproducing information data recorded on said plurality of optical discs;
   (b) determining a reproduction order of said plurality of optical discs based on said information data; and
   (c) sequentially reproducing said plurality of optical discs in accordance with said reproduction order.

2. A method as claimed in claim 1, wherein said step (b) comprises the steps of:
   (b1) evaluating said information data and obtaining reproduction order data from said information data, wherein said reproduction order data corresponds to said reproduction order;
   (b2) storing said reproduction order data in said memory; and
   (b3) reading said reproduction order data from said memory when said plurality of optical discs are to be reproduced in order to determine said reproduction order.

3. A method as claimed in claim 2, wherein said step (b) comprises the step of:
   (b1a) evaluating said plurality of optical discs to determine if each of said plurality of optical discs contains program data which relates to a same particular program; and
   (b1b) displaying an error message on a screen of a monitor when said each of said plurality of optical discs do not contain program data which relates to said same particular program.

4. A method as claimed in claim 1, wherein said step (a) comprises the steps of:

(a1) determining if at least two optical discs of said plurality of optical discs are loaded in said disc changer; and
   (a2) displaying an error message on a screen of a monitor if said at least two optical discs are not loaded in said disc changer.

5. A method as claimed in claim 3, wherein said step (a) comprises the steps of:
   (a1) determining if at least two optical discs of said plurality of optical discs are loaded in said disc changer; and
   (a2) displaying an error message on a screen of a monitor if said at least two optical discs are not loaded in said disc changer.

6. A method for sequentially reproducing optical discs in a multidisc player, wherein said multidisc player comprises a disc changer for holding a plurality of optical discs, a memory, and a microcomputer for controlling said multidisc player and wherein said method comprises the steps of:
   (a) detecting information data corresponding to each of said plurality of optical discs;
   (b) evaluating said information data to determine if program data recorded on each of said plurality of optical discs corresponds to a same particular program;
   (c) determining a reproduction order of said plurality of optical discs based on said information data if said program data recorded on each of said plurality of optical discs corresponds to said same particular program; and
   (d) sequentially reproducing said plurality of optical discs in accordance with said reproduction order to reproduce said same particular program.

7. A method as claimed in claim 6, wherein said step (a) further comprises the steps of:
   (a1) determining if at least two optical discs of said plurality of optical discs are loaded in said disc changer; and
   (a2) detecting said information data corresponding to each of said plurality of optical discs if said at least two optical discs are loaded in said disc changer.

8. A method as claimed in claim 7, wherein said step (a1) further comprises the step of:
   (a1a) displaying an error message on a screen of a monitor if said at least two optical discs are not loaded in said disc changer.

9. A method as claimed in claim 6, wherein said step (b) further comprises the step of:
   (b1) displaying an error message on a screen of a monitor if said program data recorded on each of said plurality of optical discs does not correspond to said same particular program.

10. A method as claimed in claim 6, wherein said step (c) further comprises the steps of:
    (c1) evaluating said information data and obtaining reproduction order data from said information data, wherein said reproduction order data corresponds to said reproduction order;
    (c2) storing said reproduction order data in said memory; and
    (c3) reading said reproduction order data from said memory when said plurality of optical discs are to be reproduced in order to determine said reproduction order.

11. A method as claimed in claim 6, wherein said step (a) further comprises the steps of:

(a1) determining if a sequential reproduction command is input by a user; and (a2) detecting said information data corresponding to each of said plurality of optical discs when said sequential reproduction command is input.

12. A method as claimed in claim 6, wherein said step (a) further comprises the steps of:

(a1) automatically setting said multidisc player in a sequential reproduction mode when at least two optical discs of said optical discs are input to said disc changer; and (a2) detecting said information data corresponding to each of said plurality of optical discs when said multidisc player is in said sequential reproduction mode.

13. A method as claimed in claim 7, wherein said step (c) further comprises the steps of:

(c1) evaluating said information data and obtaining reproduction order data from said information data, wherein said reproduction order data corresponds to said reproduction order;

(c2) storing said reproduction order data in said memory; and (c3) reading said reproduction order data from said memory when said plurality of optical discs are to be reproduced in order to determine said reproduction order.

14. A method as claimed in claim 13, wherein said step (a1) further comprises the step of:

(a1a) displaying an error message on a screen of a monitor if said at least two optical discs are not loaded in said disc changer.

15. A method as claimed in claim 14, wherein said step (b) further comprises the step of:

(b1) displaying an error message on said screen of said monitor if said program data recorded on each of said plurality of optical discs does not correspond to said same particular program.

16. A method as claimed in claim 10, wherein said step (a1) further comprises the steps of:

(a1a) determining if a sequential reproduction command is input by a user; and (a1b) detecting said information data corresponding to each of said plurality of optical discs when said sequential reproduction command is input.

17. A method as claimed in claim 10, wherein said step (a1) further comprises the steps of:

(a1a) automatically setting said multidisc player in a sequential reproduction mode when at least two optical discs of said optical discs are input to said disc changer; and (a1b) detecting said information data corresponding to each of said plurality of optical discs when said multidisc player is in said sequential reproduction mode.

* * * * *